(No Model.) 2 Sheets—Sheet 2.
W. BLATCHLEY.
THRASHING MACHINE.
No. 386,292. Patented July 17, 1888.
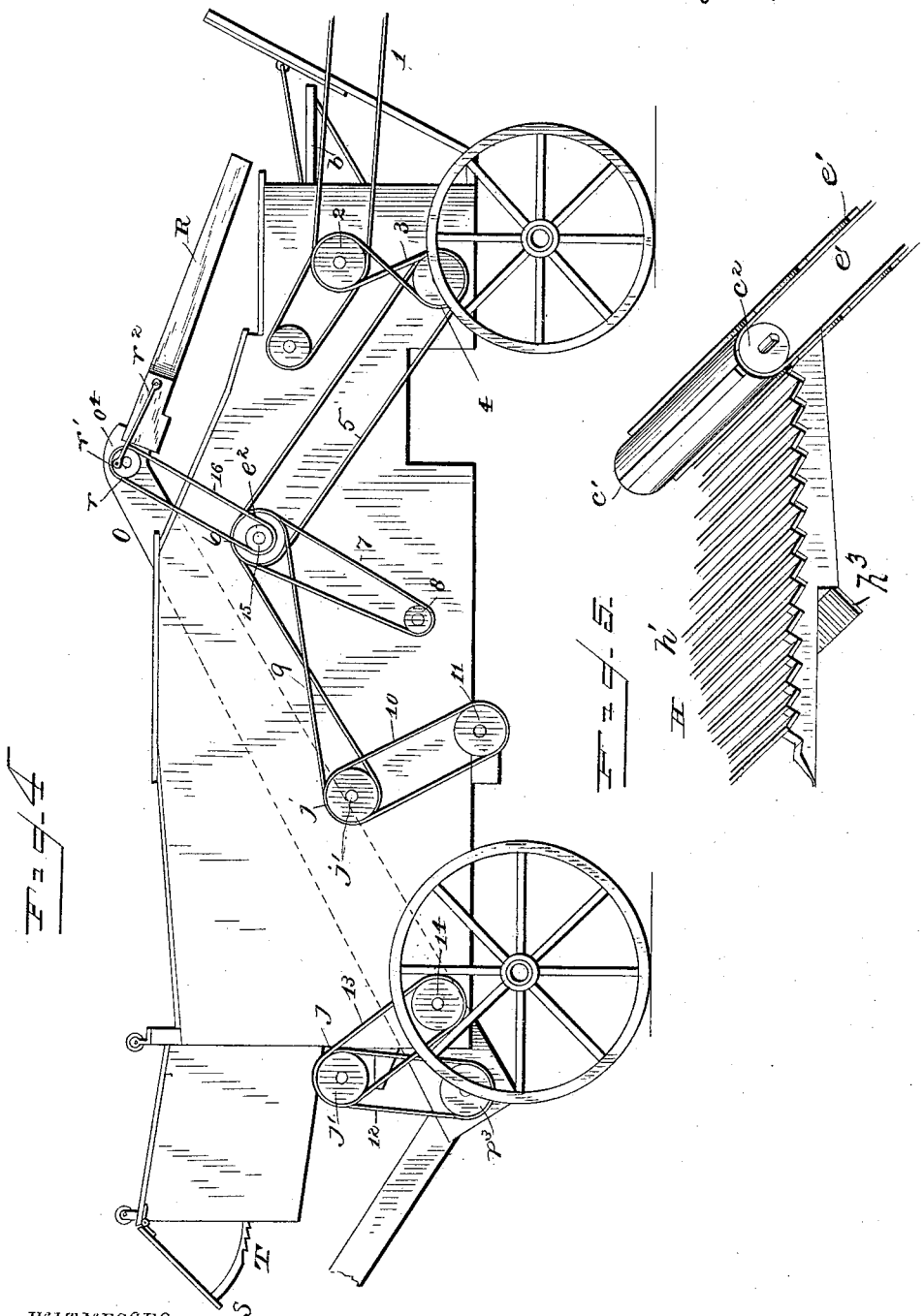
WITNESSES.
F. L. Ourand
C. W. Johnson
INVENTOR.
Washburn Blatchley,
by Geo. E. Lemon, Per P.
Attorney.

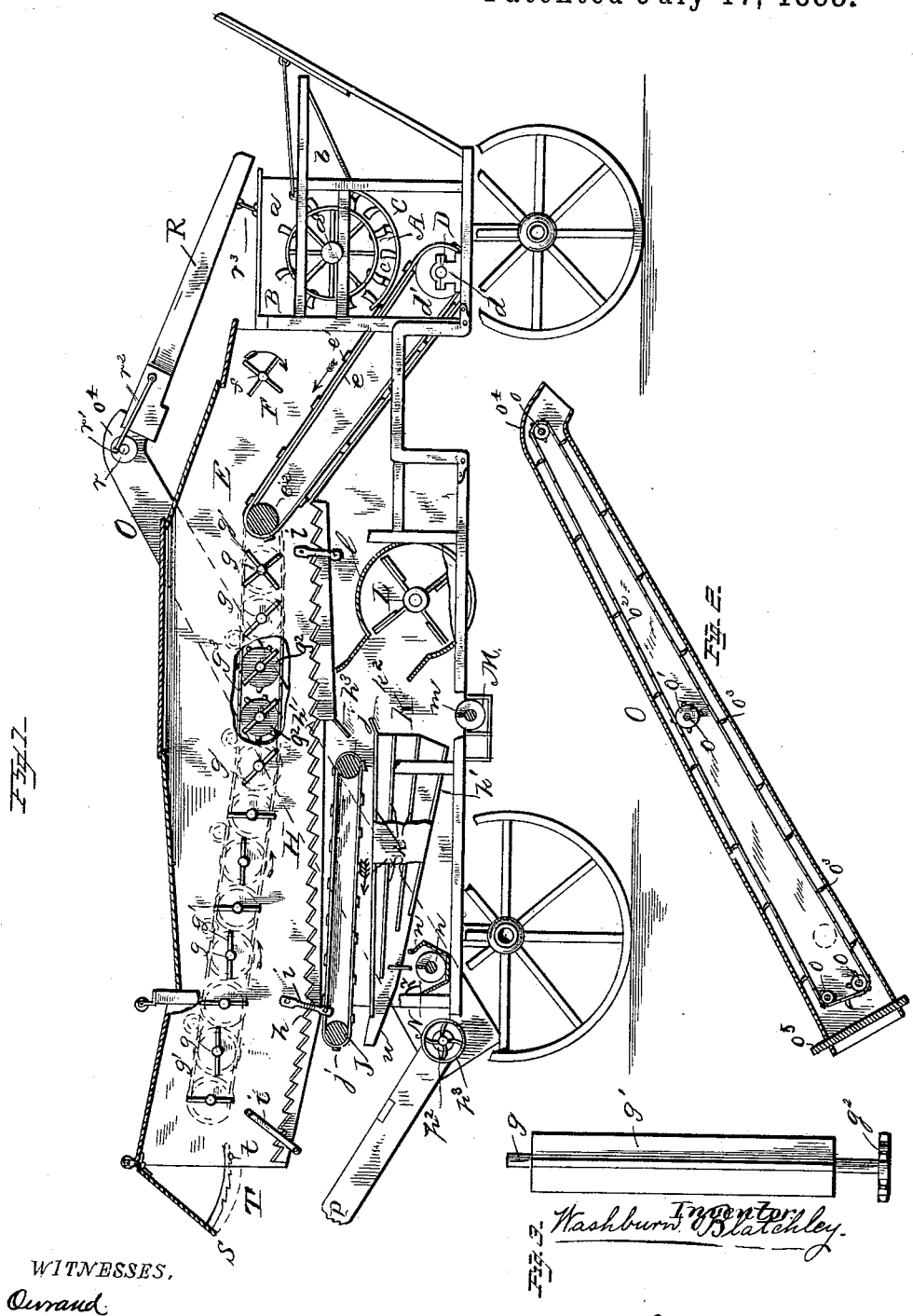

United States Patent Office.

WASHBURN BLATCHLEY, OF FOX LAKE, ASSIGNOR OF ONE-HALF TO SALMON BROWN, OF KILBOURN CITY, WISCONSIN.

THRASHING-MACHINE.

SPECIFICATION forming part of Letters Patent No. 386,292, dated July 17, 1888.

Application filed March 15, 1884. Renewed March 15, 1888. Serial No. 267,233. (No model.)

*To all whom it may concern:*

Be it known that I, WASHBURN BLATCHLEY, a citizen of the United States of America, residing at Fox Lake, in the county of Dodge and State of Wisconsin, have invented certain new and useful Improvements in Thrashing-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to thrashing-machines; and it consists in the improvements hereinafter described and claimed.

In the accompanying drawings, Figure 1 is a longitudinal section of a thrashing-machine embodying my improvements. Fig. 2 is a detail sectional view of the inclined elevator. Fig. 3 is a detail plan view of one of the fan-shafts and its pinion. Fig. 4 is a side elevation of the machine, illustrating the arrangement of belt-connections for driving the parts; and Fig. 5 is a detail perspective view illustrating the relative arrangement of part of the endless and vibrating carriers described hereinafter.

In the forward portion of the machine is located a thrashing-cylinder, A, provided peripherally with the blades or projections $a$, the said cylinder A being mounted on and turning with a shaft, $a'$, which projects through the side of the chamber B, in which the cylinder is located, and is driven exteriorly by any suitable means.

A concave, C, secured in the chamber B beneath the cylinder A, is provided with a series of blades or projections, $c$, which alternate with those of the said cylinder A. A plate, $b$, located in front of the chamber B, inclines toward an opening in the front side of said chamber immediately above the concave C.

Upon a shaft, D, journaled in bearings $d$ at the lower rear portion of the chamber B, is a series of band-pulleys, $d'$, around which is passed a closed belt, $e$, provided with a series of transverse slats, $e'$, and extending in an upward direction into a chamber, E, and passing around a roller, $e^2$. A bladed fan and beater, F, is mounted on a shaft, $f$, in the chamber E above the slotted belt $e$. A series of shafts, $g$, are arranged parallel to each other and to the roller $e^2$, and extend backward in series in the chamber E, slightly inclined upward, and each shaft is provided with two blades, $g'$, thus forming a series of beaters. Each shaft $g$, with the roller $e^2$, extends through one side of the casing and has keyed on its end a sprocket-wheel, $g^2$, which meshes with the links of a drive-chain, $g^3$, the same being driven by the roller $e^2$, to rotate all the shafts $g$ in the same direction, as indicated by the arrows, Fig. 1.

By reference to Fig. 1 it will be noted that the relative positions of the blades of the first few beaters have no significant arrangement, but that the blades of those beaters that are above the open portion of the carrier H and onward are so arranged relative to each other that the blades of each beater are at right angles to those of the others. By such an arrangement it will be understood that the first few beaters receive the grain, &c., indiscriminately and throw it upon the blades of the next adjoining beaters, which have their respective blades at right angles to each other. A large amount of the grain drops through to the open portion of the carrier H, after which the straw is tossed by the succeeding beaters until it is discharged from the machine.

A carrier-board, H, is arranged longitudinally within the chamber E beneath the shafts $g$, the portion of said carrier between the points designated by the letters $h\ h'$ consisting of a series of transverse slats arranged to leave openings between the same, while the end portions of said carrier are closed. (See Fig. 5.) The carrier is suspended by means of pivoted links $i$, and is moved longitudinally by any suitable connections and devices adapted to impart thereto a shaking movement. Roller-shafts $j$ are supported in bearings in the sides of the chamber and project at one side to carry pulleys $j'$, to effect by proper gearing the rotation of said rollers $j$. An endless slatted carrier, J, is supported upon the rollers $j$ and extends the length of the central portion of the carrier, (indicated by $h\ h'$.) A shoe, K, is located beneath the closed slatted carrier J, and consists of a series of screens, $k$, and an inclined bottom plate, $k'$, the upper screen $k$ of said shoe being provided with a heel or projection, $k^2$. An inclined plate, $h^3$, depends from the carrier H at the point $h'$, where the open slot-work commences. A blast-fan, L, is arranged in a casing, $l$, located in front of the shoe, and having a portion of said casing bent, as shown in Fig. 1, to direct the blast over the upper portion of said shoe. A duct or passage, M, communicating with the exterior of the machine, is arranged transversely in the bottom of the chamber E immediately under the heel $k^2$ of the shoe, and carries therein a spiral conveyer, $m$, to conduct the separated grain out of the machine. A second duct or passage, N, is arranged transversely in the bottom of the chamber E beneath the rear end of the shoe and communicates at one end with the lower portion of an inclined elevator, O. The said transverse duct N also contains an endless conveyer, $n$. One of the sides, $n'$, of the duct is bent, as shown in Fig. 1, to act as a deflecting plate or guard for the contents of said duct against the action of the fan, and the purpose of the duct N, spiral conveyer $n$, and elevator is to carry off the tailings.

The elevator O contains a series of shafts, $o$, journaled transversely therein, and one or more of said shafts $o$ project beyond the side of the said elevator to carry pulleys, which afford a means for driving the shafts $o$ from any of the moving parts of the machine, as hereinafter described. The shafts $o$ carry a pair of sprocket-wheels, $o'$, around which travels a chain belt, $o^2$, carrying a series of spurs, $o^3$, which move with the belt in close proximity to the top and bottom of the elevator O. The upper end, $o^4$, of the elevator O is curved, as shown in Figs. 1 and 2. The shaft $o$ located in said curved portion projects from the sides of the elevator and carries disks $r$. Each disk $r$ is eccentrically connected at $r'$ with the hooked end of a link, $r^2$, the other end of which is pivotally connected to the side of a chute, R, which is connected near its lower end to the top of the chamber B by a link, $r^3$, the lower end extending over the inclined plate $b$. The lower end of the elevator O can be opened by vertically withdrawing the slide $o^5$.

A dust-guard, S, is hinged at its top to the rear of the chamber E, and has attached at its lower end a curved rack-bar, T, which is adapted to engage a pin, $t$, projecting from the side of the chamber E, so as to regulate the pivotal position of the said dust-guard S.

The operation of the machine is as follows: The various parts to be driven having been set in motion by means of the band-and-pulley connections hereinafter referred to, grain is fed along the inclined plate $b$ between the revolving cylinder A and concave C, the teeth on said cylinder and concave effectually loosening the grain from the chaff and straw. The mixed grain, chaff, and straw are then fed on and are carried up the inclined traveling belt $e$ and passed onto the bladed beaters $g\ g'$, which, by revolving, throw the straw toward the rear of the machine, the grain and chaff falling onto the carrier H. The straw is finally thrown upon the stacker and conveyed off to be stacked. The longitudinal vibration of the carrier H causes the grain to move toward the open slatted portion of said carrier, the grain and chaff on the front closed portion of the carrier H sliding down the plate $h^3$ onto the heel $k^2$ of the shoe. The grain and chaff from the rear portion of the carrier gradually move backward onto the slatted portion thereof, fall through onto the closed and slatted endless belt J, and are carried thereby and deposited onto the heel of the shoe. The current of air from the fan L is directed upwardly and to the rear of the machine, so as to pass up through the slatted section of the carrier H. As the grain and chaff move, as previously described, said current removes and carries out beneath the dust-guard S a large proportion of chaff and other impurities, while the under side of the carrier J moves the partially-separated grain over the shoe in the direction of the arrow, Fig. 1, and thus insures a portion of pure grain being screened through the same onto the inclined bottom $k'$, so as to slide into the transverse duct M, from whence it is removed from the machine by means of the conveyer $m$. The remainder of the grain on the shoe, having a large percentage of chaff, dust, &c., is swept by carrier J off onto the inclined end-board $u$, from whence it passes to the duct N, and is moved therefrom by the conveyer $n$ to the inclined elevator O, and is moved up by the belts of the same into the chute R, which is vibrated by disk $r$ and rod $h$, and again fed onto the inclined plate $b$ to be again passed through the machine. The action of the fan L is such that it tends to create a partial vacuum under the bottom $k'$ of the shoe. The bent portion $n'$ and a depending plate, $n^2$, upon the shoe prevent any grain from being carried from the duct by the blast, which might otherwise occur. The beater-fan F acts to prevent the straw from packing on the belt $e$. A belt, 1, is driven from any suitable source of power to rotate the pulley 2, which latter is keyed on the projecting end of the shaft of the cylinder A. The pulley 2 is connected by a cross-belt, 3, with a pulley, 4, mounted on the end of the shaft D of the endless carrier. The pulley 4 is connected by a belt, 5, with a pulley, 6, on the projecting journal of the roller or shaft $e^2$. The said pulley 6 in turn drives, by means of a belt, 7, a pulley, 8, on the shaft of the blast-fan L. A belt, 9, is also passed from the pulley 6 to the pulley $j'$ to drive one of the rollers on which the endless carrier J is mounted. A belt, 10, drives the pulley 11 of the spiral conveyer $m$. The other pulley, $j'$, is driven by means of the carrier J, which imparts motion to the shaft $j$. The pulley $j'$ in turn drives by means of a belt, 12, a pulley, $p^3$, located on the end of one of the shafts $p^2$ of the straw-stacker at the end of the machine. The endless belt in the elevator O is driven by means of the pulley $r'$, being driven by a belt from a small pulley, 15, on the end of the shaft $e^2$. The rear pulley, $j'$, also drives, by means of a belt, 13, a pulley, 14, located on the end of the conveyer $n$ in the duct N.

I claim—

The combination of the carrier H, having an open portion, a series of beaters arranged above said open portion and having their blades set at right angles to each other, a shoe, K, an endless closed and slatted carrier above the same, and a fan adapted to deliver a current of air above and over said shoe and upward through the carrier H and create a vacuum beneath the shoe, substantially as set forth.

In testimony whereof I affix my signature in presence of two witnesses.

WASHBURN BLATCHLEY.

Witnesses:
J. B. HEWIT,
J. G. CAWLEY.